Jan. 18, 1944.　　　R. J. MILLER　　　2,339,503
MOTION PICTURE PROJECTOR
Filed May 15, 1941　　　2 Sheets-Sheet 1

INVENTOR.
RAYMOND J. MILLER
BY
A. C. Wilson
ATTORNEY

Jan. 18, 1944.         R. J. MILLER         2,339,503
MOTION PICTURE PROJECTOR
Filed May 15, 1941        2 Sheets-Sheet 2

INVENTOR.
RAYMOND J. MILLER
BY
ATTORNEY

Patented Jan. 18, 1944

2,339,503

UNITED STATES PATENT OFFICE 2,339,503

MOTION PICTURE PROJECTOR

Raymond J. Miller, Detroit, Mich., assignor to American Pattern and Manufacturing Co., Detroit, Mich., a copartnership consisting of said Miller and Alfred E. Wilson, Detroit, Mich.

Application May 15, 1941, Serial No. 393,507

16 Claims. (Cl. 88—24)

This invention relates to motion picture projectors and more particularly to improved means for supporting the lens assembly.

In the operation of motion picture projectors, independent visual images carried by a continuous strip of film formed of any suitable material are momentarily aligned with an aperture and are projected onto a screen by a light directed through the film and aperture in such a manner as to create the illusion of motion.

After the visual images of successively spaced film frames are projected from the film by the projecting light the images are magnified by suitable lenses in such a manner as to be reproduced on a screen of a suitable size proportionate to the size of the theater or other place where the projector is being operated and the distance of the screen from the projector.

It is desirable that means be provided to vary the distance of the lens from the film to focus the images from the film frames onto the screen. It is also desirable that the lens be securely mounted in such a manner that the spherical axis of the lens be maintained in a substantially predetermined position.

An object of this invention is therefore to provide a rigid mounting for a lens assembly whereby the distance between the lens and the film operating position in the projector can be readily varied to focus the visual images from the film frames onto the screen.

Another object of the invention is to provide an improved lens carrying assembly which may be detachably mounted on a lens carrier in such a manner that it may be readily removed to clean the lens and may be replaced in such a manner that the spherical axis of the lens is correct.

A further object resides in the provision of a rugged and strong lens carrying assembly movably mounted on a plurality of vertically spaced rods in such a manner that the lenses are accurately maintained in alignment with the projecting light.

Still another object of the invention is to provide a lens assembly movably mounted in a projector in such a manner that convection air currents around the lens are minimized by the provision of suitable sealing means to prevent the flow of air into the film compartment from around the lens assembly.

Another object resides in the provision of concentric clamping rings and improved lens adapters whereby lenses of varying sizes can be securely mounted in a standard removable lens carrying tube assembly.

Yet a still further object of the invention is to provide a novel bayonet attachment for detachably securing a lens tube assembly in a lens carrier arm in such a manner that the lens is always positioned in the projector in proper spherical correction.

Another object of the invention resides in the provision of an improved focusing device whereby a micrometer adjustment is provided to facilitate focusing and a locking device is provided to lock the lens assembly in any focused position.

A further object is to provide means for readily removing and replacing a lens assembly to permit cleaning, inspection or repair without disturbing the focused position and the spherically corrected position of the lens.

Still a further object of the invention is to provide an improved and rugged lens carrying and supporting member which can be economically manufactured.

Yet another object is to provide a lens supporting and carrying bracket which may be readily removed as a unit from the projector head.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views.

Figure 1:
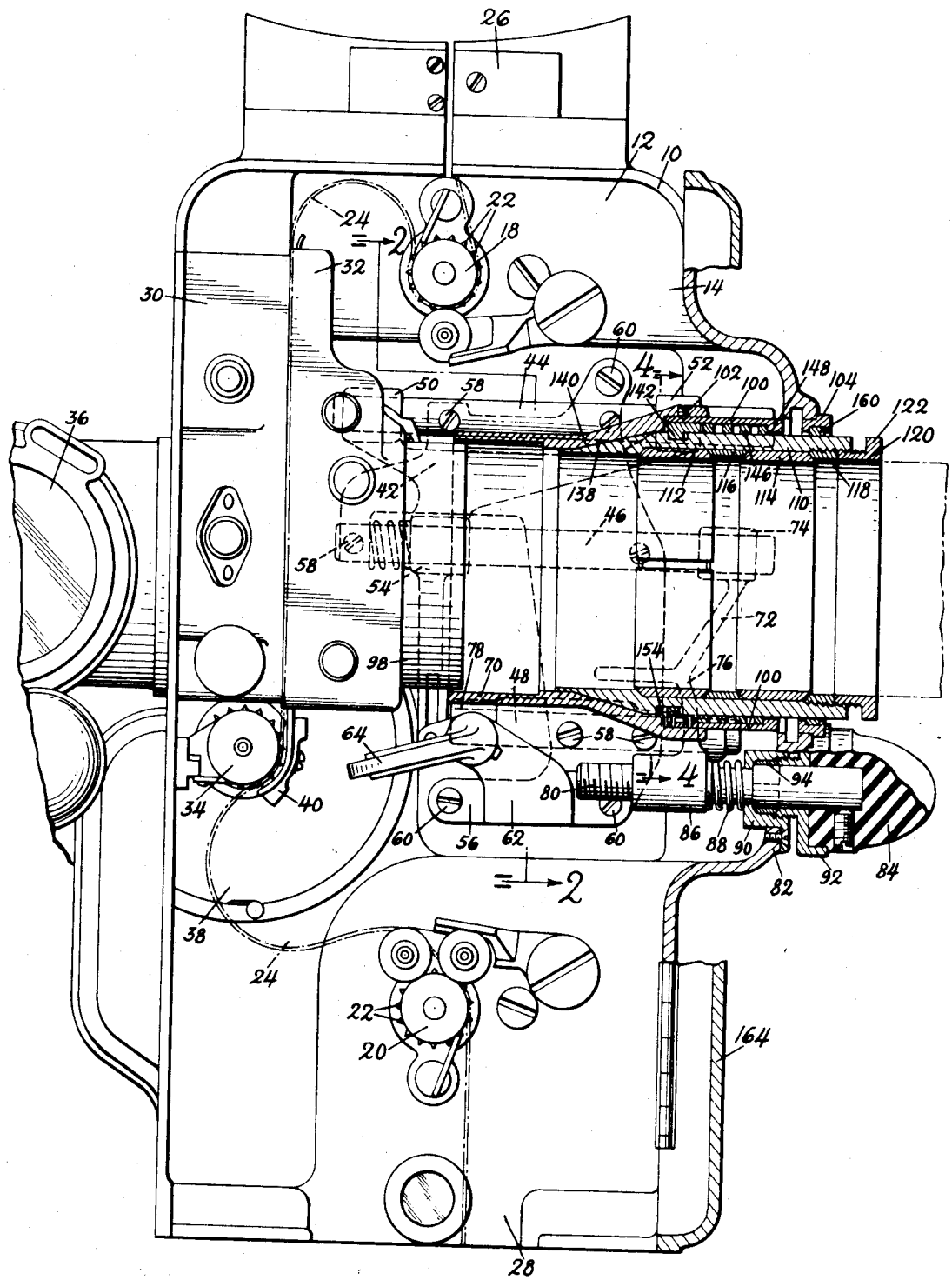
Fig. 1 is a side elevation, partly in section, of a motion picture projector embodying the present invention.
Figure 2:
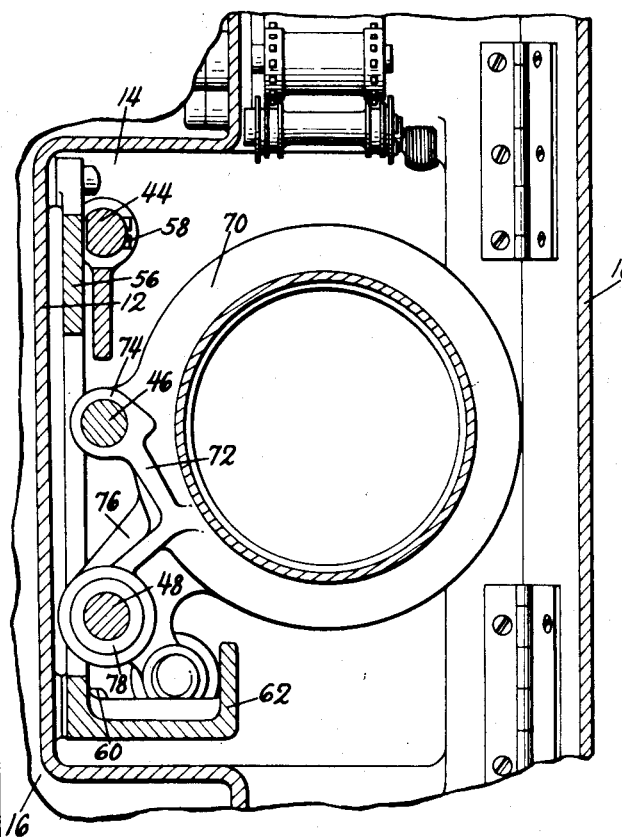
Fig. 2 is a sectional view taken substantially on the line 2—2 of Fig. 1, looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to the drawings, it will be observed that the invention is illustrated as being embodied in a motion picture projector having a main casing 10. The space within the main casing 10 is divided by a substantially vertically extending wall 12 into a film compartment 14 and a mechanism compartment 16.

The film compartment 14 is virtually isolated from the mechanism compartment 16 and preferably contains all of the film driving and light directing and focusing mechanism.

The mechanism compartment preferably contains all of the mechanism required to propel the film driving sprockets employed to intermittently align successively spaced film frames with an aperture of an aperture plate positioned in the film compartment and to drive a shutter to interrupt the flow of light through the aperture and film to prevent streaking and visible flicker of the images on the screen.

Upper and lower film feed sprockets 18 and 20 having sprocket teeth 22 are positioned in the film compartment 14 and operate to withdraw film 24 from a film magazine positioned above a fire tray 26 and discharge it through an opening 28 preferably communicating with a sound head.

After leaving the upper sprocket 18 the film 24 is preferably directed between an aperture plate housing 30 and a pressure plate housing 32 and is directed over an intermittently driven sprocket 34. The film 24 is drawn into and discharged from the film compartment 14 at a substantially constant speed, and spaced film frames are momentarily aligned with the aperture of the aperture plate by the intermittently driven sprocket 34.

A shutter rotatably mounted in a housing 36 operates in synchronism with an intermittence movement positioned in a housing 38 carried by the wall 12 to interrupt the flow of projecting light as the film 24 is moved relative to the aperture of the aperture plate by the intermittently driven sprocket 34.

The pressure plate housing 32 is provided with spaced film engaging shoes including an intermittence sprocket shoe 40 to yieldingly urge the film 24 into engagement with spaced film tracks positioned adjacent the aperture plate to maintain the film in a substantially predetermined relation relative to the aperture of the aperture plate and to the intermittently driven sprocket 34.

The pressure plate housing 32 is preferably movable longitudinally in the film compartment 14 to separate it from the aperture plate housing 30 to enable the operator to thread film into the projector. The pressure plate housing 32 may be mounted on a carrier arm 42 slidably mounted on two of a plurality of vertically spaced rods 44, 46 and 48 in such a manner as to be supported on suitable bearings at three spaced points 50, 52 and 54 to provide a stable mounting.

The vertically spaced rods 44, 46 and 48 may be supported on a bracket 56 as by spaced screws 58, and the bracket 56 may be suitably attached to the intermediate wall 12 as by a plurality of spaced screws 60. The carrier arm 42 supporting the pressure plate housing 32 may be moved longitudinally in the film compartment 14 by suitable motion transmitting mechanism interposed between the arm 42 and a flange 62 carried by the bracket 56 and controlled by a lever 64.

Suitable lenses positioned in the film compartment 14 may be provided to magnify the images from the spaced film frames to reproduce them on the screen in a desired proportion.

Spaced lenses secured in a lens carrying barrel are employed in motion picture projectors to receive the projected images from the film and magnify them to be reproduced on a screen. Each lens assembly preferably includes an objective lens positioned closer to the aperture of the aperture plate and a projecting lens positioned forwardly of the objective lens.

Means may be provided to support the lenses in the film compartment 14 in such a manner that the lens assembly including the objective and the projecting lenses may be moved towards or away from the aperture of the aperture plate to permit focusing of the projected images on the screen.

One desirable form of such lens supporting means comprises a tubular lens carrier 70 having an arm 72 provided with a suitable bearing 74 slidably mounted on the middle rod 46 and an arm 76 provided with a plurality of bearings 78 slidably mounted on the lower rod 48. The lens carrier is thus firmly supported in the film compartment in two planes on the rods 46 and 48.

The lenses may be moved towards or away from the film operating position to focus the projected images on the screen by bodily movement of the lens carrier 70 in the film compartment. This bodily movement of the carrier 70 may be accomplished by a focusing bolt 80 journalled in the front wall 82 of the casing 10 and provided with a manually operable actuating knob 84. The focusing bolt 80 is threaded through a boss 86 fixed to the carrier 70 whereby upon rotation of the knob 84 the carrier 70 is moved longitudinally on the rods 46 and 48. A spring 88 may be interposed between the boss 86 and a fitting 90 to yieldingly urge the carrier 70 towards the film operating position and to prevent backlash, and in effect to give a micrometer focusing adjustment.

The entire lens supporting assembly including the lens carrier 70, bracket 56, and carrier arms for the lens carrier, and the movable pressure plate housing may be removed from the film compartment 14 by simply removing the screws 60. The lens supporting rods 46 and 48 together with the arms 72 and 76 and the lens carrier 70 may be removed from the bracket 56 by removing the screws 58 projecting through the rods 46 and 48.

Means may be provided to lock the lens carrier 70 in any adjusted position because it is unnecessary to refocus each time the lens and the lens supporting withdrawal tube are removed from the carrier 70 for inspection, cleaning or repair.

One desirable form of a locking device comprises a locking ring 92 threaded into the fitting 90 and having a tapered inner end portion to engage an oppositely tapered end portion of a split ring or pair of locking segments 94 concentrically mounted on a shaft portion of the focusing bolt 80 and positioned in the fitting 90.

In the operation of the focusing mechanism the knob 84 is rotated to move the lens carrier 70 longitudinally in the film compartment 14 until the desired focus of the projected images is obtained. Accurate focusing adjustment is possible because of the spring 88 which maintains engagement between cooperating sides of adjacent threads of the bolt 80 and the boss 86. When the desired focused position has been attained the locking ring 92 is rotated whereupon the tapered end walls engaging the tapered ends of the locking segments 94 urge the locking segments securely into engagement with the shaft portion of the focusing bolt 80 to lock the bolt against rotation relative to the fitting 90 and front wall 82.

The space between the pressure plate housing 32 and the lens carrier 70 may be shielded by a telescoping ring 98 to prevent the escape of light rays and to permit longitudinal movement of the housing 32 to enable the operator to thread film into the projector and longitudinal movement of the lens carrier 70 to permit focusing.

Lens holding means may be provided to detachably lock the lenses in the lens carrier 70 and in a sleeve 100 attached to the carrier 70 by a plurality of screws 102. The sleeve 100 extends forwardly from the carrier 70 towards the front wall 82 of the main casing 10. A sleeve 104 aligned with the sleeve 100 is attached to the front wall 82 and is provided with a radially extending flange to engage the front wall to prevent the flow of air currents and dust or dirt into the film compartment 14.

The lenses may be maintained in a substantially predetermined angular and longitudinal relation relative to the film operating position whereby the spherical axis and the focal plane of the lenses remain unchanged by removal and replacement of the lens supporting withdrawal tube assembly.

One desirable form of such lens holding means comprises a lens supporting withdrawal tube 110 having a plurality of longitudinally spaced split clamping rings 112 and 114 adapted to engage and lock the lens carrying barrel. The split clamping rings 112 and 114 are provided on each side with male tapered side walls adapted to be engaged and actuated by cooperating female tapered side walls carried by the withdrawal tube 110 and solid rings 116 and 118 slidably mounted in the tube 110. The ring 116 is provided with oppositely disposed female tapered side walls to engage the male tapered side walls of the split clamping rings 116 and 118. The ring 118 is provided with a female tapered side wall to engage the cooperating male tapered side wall of the split clamping ring 114. A collar 120 preferably having a knurled actuating flange 122 is threaded into the end of the withdrawal tube 110 to engage the ring 118 and move it longitudinally in the withdrawal tube 110 to compress the clamping rings 112 and 114 into engagement with the lens carrying barrel to lock it in the withdrawal tube 110.

Figure 7:
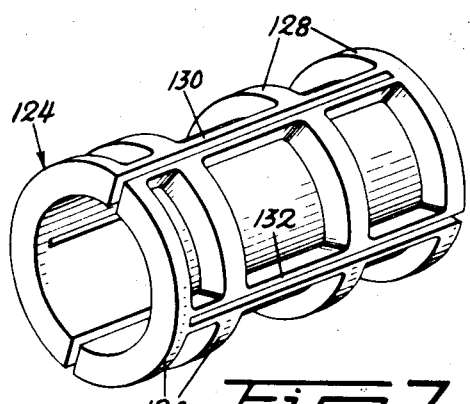
Fig. 7 is an isometric projection of a lens adapter tube.

Means may be provided to support lens carrying barrels of varying sizes in the withdrawal tube 110. One desirable form of lens supporting mechanism comprises an adapter tube 124 illustrated in Fig. 7.

The lens adapter tube 124 may be made in varying sizes to accommodate lens carrying barrels of varying diameters to hold them in concentric alignment within the withdrawal tube 110. As illustrated the lens adapter is in the form of a cylinder having a plurality of spaced ribs 126 and 128 of suitable outside diameter to be received within the tube 110 and be engaged by the split clamping rings 112 and 114. The internal diameter of different adapter tubes varies in accordance with the diameter of the lens carrying barrels which it is desired to support. The spaced ribs 126 and 128 may be interconnected by longitudinally extending webs 130 and 132.

The webs 130 may be split longitudinally from the outer rib 128 as illustrated whereby the end of the adapted tube 124 adjacent the ribs 126 may compress under the influence of the split clamping ring 112 to engage one end of the lens carrying barrel. The webs 132 lying in a different plane than the webs 130 may also be split longitudinally from the outer rib 126 as illustrated whereby the end of the adapter tube 124 adjacent the ribs 128 may compress under the force exerted by the split clamping ring 114 to engage the periphery of the other end of the lens carrying barrel to lock it concentrically in the adapter tube 124.

Means may be provided to detachably lock the withdrawal tube 110 in a substantially predetermined position longitudinally and angularly relative to the lens carrier 70 and the sleeve 100.

The rearward end of the withdrawal tube 110 may be tapered as indicated at 138 to engage a reversely tapered section 140 of the lens carrier 70 to maintain the withdrawal tube and its lenses in a predetermined longitudinal relation relative to the carrier arm 70 and the operating position of the film.

Figure 5:
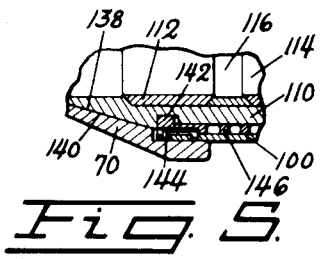
Fig. 5 is a sectional view taken substantially on the line 5—5 of Fig. 4, looking in the direction of the arrows.
Figure 4:
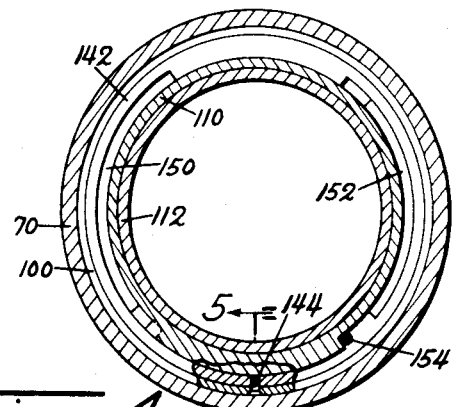
Fig. 4 is a sectional view taken substantially on the line 4—4 of Fig. 1, looking in the direction of the arrows.
Figure 6:
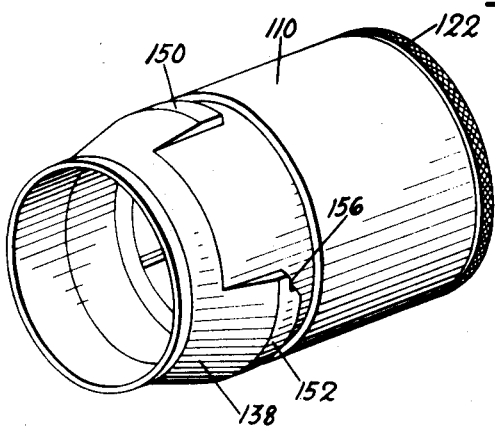
Fig. 6 is an isometric projection of the lens carrying tube.

An indexing ring 142 may be concentrically mounted in the sleeve 100 and lens carrier 70. As illustrated in Fig. 5, the indexing ring 142 is maintained in a fixed angular relation relative to the sleeve 100 by a key 144 secured to the sleeve 100 and extending longitudinally in a slot formed in the indexing ring 142. The indexing ring 142 may be yieldingly urged towards the lens carrier 70 and film operating position by a spring 146 interposed between the ring 142 and an inwardly directed flange 148 carried by the sleeve 100.

Locking means such for example as cooperating bayonet attachment locking segments 150 and 152 may be provided between the withdrawal tube 110 and the indexing ring 142. The locking segments 150 and 152 are of different angular length whereby it is only possible to insert the withdrawal tube 110 into the indexing ring 142 in one angular position in a complete revolution. The locking segments 150 and 152 of the indexing ring and of the withdrawal tube have their initially contacting portions bevelled to facilitate rotation of the tube towards the locking position in the indexing ring 142. The indexing ring 142 is provided with a pin 154 to engage in a notch 156 of the locking segment 152 of the withdrawal tube 110 to limit rotational movement of the tube 110 within the ring 142 and to maintain the withdrawal tube in a predetermined angular relation relative to the indexing ring and lens carrier 70.

To remove the withdrawal tube 110 from the projector to clean or replace the lenses the forward end of the tube is grasped and rotated in the counterclockwise direction. The locking segments 150 and 152 of the tube become aligned with the slots between the cooperating locking segments of the indexing ring 142 whereupon the withdrawal tube 110 can be pulled forwardly and withdrawn from the lens carrier 70.

When it is desired to replace the withdrawal tube 110 in the projector its tapered end 138 is directed through the aperture in the sleeve 104 and the tube is rotated until its locking segments 150 and 152 are aligned with the slots between the locking segments of the indexing ring 142. It will be noted that since the locking segments 150 and 152 are of different angular length, the tube can be inserted in only one angular position. The spherical axis of the lens is therefore correct when the tube is moved to the locked position.

The tapered end portion 138 of the withdrawal tube 110 is placed in contact with the female tapered portion 140 of the lens carrier 70. The tube is then rotated in the clockwise direction whereupon the initially contacting portions of the locking segments of the tube and indexing ring cause the ring to move axially compressing the spring 146. When the tube has been rotated a substantially predetermined amount the pin 154 carried by the indexing ring 142 engages within the notch 156 and locks the tube 110 in a predetermined angular position. The spring 146 exerts a force through the indexing ring and locking segments 150 and 152 to yieldingly urge the withdrawal tube in assembled position with the tapered portions of the tube and carrier arm 138 and 140, respectively, in engagement.

It will be noted that the lenses may be readily removed from the projector for cleaning and replaced without disturbing the focused position and without changing the spherical axis of the lens.

Figure 3:
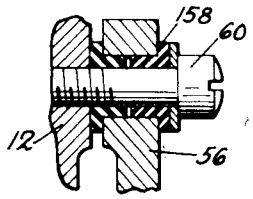
Fig. 3 is an enlarged sectional view of one desirable form of heat insulating bracket.

The lens assembly may be virtually isolated from the main casing 10 of the projector to minimize the flow of air currents, heat and dust to the lens assembly. As illustrated in Fig. 3, the bracket 56 which supports the lens carrier 70 may be separated from the screws 60 attaching it to the intermediate wall 12 by means of bushings 158 formed of material having a low rate of heat conductivity to retard the flow of heat from the intermediate wall 12. If desired, suitable insulating material may be interposed between the rods 46 and 48 carrying the lens assembly and the bracket 56.

The withdrawal tube 110 may be separated from the sleeve 104 by a resilient ring 160 formed of rubber or other suitable material to prevent the flow of air through the space between the front wall 82 of the main casing 10 and the withdrawal tube 110. Since dust and dirt are eliminated from the film compartment 14, the film and film guiding and driving members are not subjected to excessive wear caused by the abrasive action of dust thereon. The lenses are therefore subjected to minimum variation of temperature whereby aberration occasioned by distortion of the lenses caused by variation of the retained heat in the lenses is virtually eliminated. Since no air can be drawn into the film compartment around the withdrawal tube the possibility of dust and dirt collecting on the lenses is minimized. The telescoping ring 98 interposed between the lens carrier 70 and the pressure plate housing 32 prevents the inflow of air to the lens assembly from the film compartment 14, and the film compartment is closed by a door 164.

This is a continuation-in-part of my co-pending application Serial No. 250,310, filed January 11, 1939, and which has become Patent No. 2,312,663 dated March 2, 1943.

I claim:

1. In a motion picture projector, a casing having a front wall, a film compartment in the casing, a plurality of spaced rods extending longitudinally in the film compartment, a lens carrier movably mounted on said rods, motion transmitting means between the front wall and the lens carrier, manually operable means to actuate the motion transmitting means to move the lens carrier on the rods to focus projected images, means to lock the motion transmitting means to maintain the lens carrier in any focused position, a lens supporting tube, and connecting means between the lens carrier and the lens supporting tube comprising a bayonet attachment so constructed and arranged that the lens supporting tube can be readily removed from the lens carrier for cleaning or repair without disturbing the focused position of the lens carrier and replaced therein in a substantially predetermined angular relation such that the spherical axis of the lens is correct.

2. In a motion picture projector having a main casing, a film compartment in the casing, a lens carrier in the film compartment, a lens supporting withdrawal tube, cooperating tapered surfaces interposed between the lens carrier and withdrawal tube, a sleeve between the lens carrier and the front wall of the casing, an indexing ring concentrically mounted in the sleeve, cooperating unsymmetrically disposed bayonet attachment locking segments interposed between the indexing ring and withdrawal tube whereby the lens tube can be positioned in the lens carrier in one angular position only, and yielding means urging the indexing ring and withdrawal tube towards the lens carrier to maintain said tapered surfaces in contact to position the lens tube in a predetermined longitudinal position in the film compartment.

3. In a motion picture projector having a main casing, a wall dividing the space within the casing into mechanism and film compartments, an aperture plate in the film compartment, a plurality of spaced rods carried by said wall and extending longitudinally in the film compartment, a lens carrier supportedly mounted at three spaced points on said rods for longitudinal movement in the film compartment, manually operable means including a threaded member interposed between the casing and lens carrier to move the lens carrier longitudinally in the film compartment relative to the aperture plate to focus projected images, a lens supporting tube, connecting means between the lens carrier and the lens supporting tube, said connecting means being so constructed and arranged that the tube can be detachably locked in the lens carrier in substantially predetermined angular and longitudinal positions, and sealing means between the casing and the lens supporting tube.

4. In a motion picture projector, a film compartment having a fixed wall, a lens carrier mounted on said wall for longitudinal movement in the film compartment, manually operable means to move the lens carrier relative to the wall to focus projected images, locking means to maintain the lens carrier in any focused position, a lens supporting tube, a plurality of longitudinally spaced contractable lens clamping rings in the lens supporting tube, means including a member threaded into the tube to contract the clamping rings, connecting means between the lens carrier and the lens supporting tube comprising a bayonet attachment so constructed and arranged that the lens supporting tube can be readily removed from the lens carrier for cleaning or repair without disturbing the focused position of the lens carrier and replaced therein in a substantially predetermined angular and longitudinally focused relation such that the spherical axis of the lens is correct, and yielding means urging the lens supporting tube towards the assembled position relative to the lens carrier.

5. In a motion picture projector having a main casing, a film compartment in the casing, a lens carrier in the film compartment, a lens supporting withdrawal tube, cooperating tapered surfaces carried by the lens carrier and withdrawal tube, a sleeve between the lens carrier and the front wall of the casing, an indexing ring associated with the carrier arm and said sleeve, means to maintain the indexing ring in a predetermined angular relation relative to the lens carrier, cooperating bayonet attachment locking segments carried by the indexing ring and withdrawal tube, yielding means urging the indexing ring and withdrawal tube towards the lens carrier, and locking means between the indexing ring and withdrawal tube to detachably lock the tube in a predetermined angular position relative to the indexing ring and carrier arm whereby the spherical axis of the lenses are correct.

6. A lens carrying member for a motion picture projector comprising a tube having an internal female tapered surface, a plurality of split clamping rings having male tapered side walls, one of said male tapered side walls being positioned to engage the internal female tapered surface of the tube, a solid ring interposed between the clamping rings and having female tapered side walls positioned to engage the male tapered side walls of the clamping rings, a solid ring having a female tapered side wall positioned to engage the male tapered side wall of one of the clamping rings, and a sleeve threaded into the tube to engage the last mentioned solid ring to urge said rings towards the internal female tapered surface of the tube to compress the split clamping rings.

7. A lens carrying member for a motion picture projector comprising a tube, a plurality of contractable clamping rings spaced longitudinally in the tube and having male bevelled side walls, a solid ring having female bevelled side walls interposed between the clamping rings, and a collar threaded into the end of the tube to urge the contractable clamping rings into engagement with the solid rings to compress the clamping rings.

8. A lens carrying member for a motion picture projector comprising a tube having an internal female tapered surface, a plurality of split clamping rings having male tapered side walls, one of said male tapered side walls being positioned to engage the internal female tapered surface of the tube, a solid ring interposed between the clamping rings and having female tapered side walls positioned to engage the male tapered side walls of the clamping rings, a solid ring having a female tapered side wall positioned to engage the male tapered side wall of one of the clamping rings, a sleeve threaded into the tube to engage the last mentioned solid ring to urge said rings towards the internal female tapered surface of the tube to compress the split clamping rings, and a plurality of bayonet locking segments carried by the tube.

9. In a motion picture projector, a housing, a wall dividing the space within the projector into mechanism and film compartments, an aperture plate in the film compartment, a bracket detachably connected to said wall, a pair of vertically spaced longitudinally extending supports carried by the bracket, a lens carrier supported at at least three spaced points on said vertically spaced supports for longitudinal movement in the film compartment relative to the aperture plate to focus projected images, motion transmitting means between the housing and lens carrier to move the lens carrier, means to lock said lens carrier in any focused position, and a lens supporting withdrawal tube detachably connected to the lens carrier.

10. A motion picture projector comprising a housing, a wall dividing the space within the projector into mechanism and film compartments, an aperture plate in the film compartment, a bracket detachably connected to said wall, a pair of vertically spaced longitudinally extending supports carried by the bracket, resilient means interposed between said supports and wall, a lens carrier supported at at least three spaced points on said vertically spaced supports for longitudinal movement in the film compartment relative to the aperture plate to focus projected images, motion transmitting means between the housing and lens carrier to move the lens carrier, means to lock said lens carrier in any focused position, a lens supporting withdrawal tube projecting through the housing and detachably connected to the lens carrier, and resilient means between the housing and lens supporting withdrawal tube.

11. In a motion picture projector having a main casing including a front wall, a wall dividing the space within the casing into mechanism and film compartments, an aperture plate in the film compartment, a lens carrier movably mounted on the dividing wall for longitudinal movement in the film compartment, manually operable means to move the lens carrier longitudinally in the film compartment relative to the aperture plate to focus projected images, locking means between the front wall of the main casing and the lens carrier, manually operable means for the locking means to maintain the lens carrier in any longitudinally focused position in the film compartment, a lens holding tube, connecting means between the lens carrier and the lens holding tube whereby the lens holding tube may be readily removed from the lens carrier and replaced therein in predetermined angular and longitudinal positions without disturbing the spherical axis and focused positions of the lens.

12. In a motion picture projector having a film compartment including a front wall, a lens carrier in the film compartment, manually operable means including a threaded stud journaled in the front wall and operably connected to the lens carrier to move the lens carrier longitudinally in the film compartment to focus projected images, yielding means urging the lens carrier into engagement with one side of the threads of the stud to provide a micrometer adjustment, locking means between the front wall and stud, manually operable means to actuate the locking means to lock the lens carrier in any focused position, a lens holding tube, connecting means between the lens carrier and the lens holding tube whereby the lens holding tube may be readily removed from the lens carrier and replaced therein in predetermined angular and longitudinal positions without disturbing the spherical axis and focused positions of the lens.

13. In a motion picture projector having a casing including a film compartment, a lens carrier movable longitudinally in the film compartment for focusing projected images, manually operable means to clamp the lens carrier in any focused position in the film compartment, a lens-supporting withdrawal tube, cooperating tapered surfaces between the lens carrier and the withdrawal tube, connecting means between the withdrawal tube and the lens carrier comprising a bayonet attachment so constructed and arranged that the lens-supporting withdrawal tube can be readily removed from the lens carrier for cleaning or repair and replaced therein in a predetermined longitudinal position without disturbing the focused position of the lens, and yielding means between the lens carrier and the withdrawal tube to urge said tapered surfaces into engagement when the tube is assembled in the lens carrier.

14. In a motion picture projector, a housing, a plurality of horizontally extending rods in the housing, a lens tube carrier arm slidably mounted on a plurality of said rods, manually operable means including a member journaled in the housing to move the carrier arm on the rods, means associated with the housing and said member to lock the carrier arm relative to the rods, a lens supporting tube, connecting means between the tube and carrier arm comprising a locking connection so constructed and arranged that the lens-supporting tube may be removed from the carrier arm and replaced therein in predetermined angular and longitudinal positions without disturbing the spherical axis and focused position of the lens, and resilient means interposed between the housing and the lens-supporting tube to substantially seal the space between the housing and the lens tube when said tube is replaced in the carrier arm.

15. In a motion picture projector having a main casing including a front wall, a film compartment in the casing, a lens-supporting bracket in the film compartment, a lens carrier movable longitudinally on said bracket in the film compartment to focus projected images, a lens-supporting withdrawal tube projecting through the front wall of the main casing, mechanical connecting means between the lens-supporting tube and the lens carrier whereby the tube may be readily removed from the lens carrier for cleaning or repair and reassembled therein in predetermined angular and longitudinal positions without disturbing the spherical axis and focused position of the lens, and sealing means between the front wall and the lens-supporting withdrawal tube whereby flow of air into the film compartment around the withdrawal tube is virtually eliminated.

16. In a motion picture projector having a main casing including a front wall, an intermediate wall dividing the space within the casing into mechanism and film compartments, a lens carrier in the film compartment, thermally insulated connecting means between the lens carrier and the intermediate wall, a lens-supporting withdrawal tube projecting through the front wall, mechanical connecting means between the lens-supporting tube and the lens carrier whereby the tube may be readily removed from the lens carrier for cleaning or repair and reassembled therein in predetermined angular and longitudinal positions without disturbing the spherical axis and focused position of the lens, and thermally insulating material between the withdrawal tube and the front wall.

RAYMOND J. MILLER.